Patented Jan. 8, 1952

2,581,832

UNITED STATES PATENT OFFICE 2,581,832

HETEROGENEOUS, BASIC HYDROLYSIS OF CARBOXYLIC ACID ESTERS OF POLYVINYL ALCOHOL WITH QUATERNARY AMMONIUM BASES

Roe C. Blume, Waynesboro, Va., assignor to E. I. du Pont de Nemours & Company, Wilmington, Del., a corporation of Delaware No Drawing. Application September 5, 1947, Serial No. 772,458

7 Claims. (Cl. 260—91.3)

This invention relates to the hydrolysis of polyvinyl esters and more particularly to the heterogeneous hydrolysis, in aqueous, basic medium, of water-insoluble esters of the polyvinyl type.

Previously known methods of hydrolyzing water-insoluble polyvinyl esters have been limited because of certain, inherent disadvantages. For example, the homogeneous hydrolysis of polyvinyl acetate in alcoholic solutions of a sodium alkoxide generally yields a polyvinyl alcohol of high ash content and a monomeric ester which is normally not readily recoverable for commercial purposes. This latter difficulty is also encountered in the acidic hydrolysis of polyvinyl acetate in its alcoholic solutions. Aqueous hydrolysis of polyvinyl acetate in its acetic acid solutions requires the recovery of large quantities of acetic acid, the amount being usually in the range of 9 to 10 pounds of acetic acid per pound of the polymer produced. Hydrolysis of polyvinyl acetate in aqueous hydrochloric acid is an extremely slow reaction. Accordingly, it is economically desirable to hydrolyze polyvinyl esters in such a way that the acid residue from the polymeric ester is obtained as the free acid or in salt form rather than as a corresponding ester and so that the amount of solvent to be recovered, the amount of catalyst needed, and the total time required are minimized.

This invention has as an object the hydrolysis of water-insoluble, polyvinyl esters by a process whereby the above mentioned difficulties are avoided. A further object is the provision of a process for the heterogeneous hydrolysis of water-insoluble polyvinyl esters. A still further object is the hydrolysis, in aqueous media containing organic bases, of water-insoluble organic esters, such as polyvinyl esters. Other objects will appear hereinafter.

These objects are accomplished by the following invention in which water-insoluble polyvinyl esters are hydrolyzed by heating them in aqueous media containing an organic base, such as a quaternary ammonium base, and, preferably, a strong water-soluble inorganic base.

In order to accomplish the desired hydrolysis the organic base must be a strong base and must be appreciably soluble in the ester being hydrolyzed. It has been found that quaternary ammonium bases containing at least one alkyl chain four or more carbon atoms in length meet these requirements. If an inorganic base is to be used, it must be a strong base and water-soluble. For effective hydrolysis, the alkaline media prepared should have a pH of 10 or more and a surface tension of less than 50 dynes per centimeter.

The following examples, wherein parts are by weight, are given by way of illustration and are not to be considered as limitative.

EXAMPLE I

An aqueous hydrolyzing medium was prepared by dissolving 4.6 parts of sodium hydroxide and 1 part of cetyldimethylbenzylammonium chloride in 100 parts of water. The alkaline solution formed had a pH of about 12 and a surface tension of about 40 dynes per centimeter. Ten parts of polyvinyl acetate (commercially designated as RH-838) was added and the heterogeneous mixture was heated with stirring for 36 hours at 90° C. to 95° C. Prior to this time a homogeneous reaction mixture resulted. The polyvinyl alcohol dissolved in the aqueous alkaline media could be obtained in flake or powder form by the slow addition of a non-solvent followed by filtration or by removing the water by evaporation or distillation. Further purification of the polymeric alcohol could be effected by well known procedures, such as washing techniques.

In another experiment using cetyldimethylbenzylammonium chloride it was determined that hydrolysis was complete in 16 hours using conditions similar to the above. In still another experiment this quaternary ammonium compound was used as the free base and in slightly more than equivalent amounts with no added inorganic base. Hydrolysis was completed in about 20 hours.

EXAMPLE II

To 100 parts of water were added 4.6 parts of sodium hydroxide, 10 parts of polyvinyl acetate and 1 part of tetrabutylammonium iodide. The resultant mixture, which had a pH of about 12 and a surface tension about 48 dynes per centimeter, was stirred at 90° C. to 95° C. for 3 hours. At the end of this time hydrolysis was stopped. Analysis showed the polyvinyl acetate to be 80% hydrolyzed. In another similar experiment it was determined that hydrolysis was completed after 16 hours stirring at 90° C. to 95° C.

EXAMPLE III

To 108 parts of an aqueous emulsion of polymethyl acrylate containing 40% polymer was added 20 parts of a 20% aqueous solution of dodecyltrimethylammonium chloride and 20 parts of sodium hydroxide. The pH of the resultant reaction mixture was close to 12 and its surface tension was about 29 dynes per centimeter. A transparent solution of sodium polymethylacrylate was obtained after 30 minutes heating at 90° C. to 95° C. In a control experiment using no dodecyltrimethylammonium chloride hydrolysis was still incomplete after 4.5 hours. This solution could be used directly in commercial applications such as in textile sizing.

EXAMPLE IV

A mixture of 100 parts of water, 10 parts of polyvinyl acetate in bead form, 4.6 parts of sodium hydroxide and 1 part of tetradecyltrimethylammonium chloride was heated at 90° C. to 95° C. with stirring. The reaction medium had a pH of about 12 and a surface tension of about 30 dynes per centimeter. In 5.5 hours the heterogeneous mixture was readily converted to a clear solution in which the ester was completely hydrolyzed. Isolation of the resultant polyvinyl alcohol was accomplished by evaporation of the water followed by washing to remove the salt byproducts.

In general any quaternary ammonium base which is appreciably soluble in the polymeric ester being hydrolyzed is operative in this invention. It has been found that any quaternary ammonium base having at least one alkyl chain composed of four or more carbon atoms is effective in the process of this invention. For example, the following compounds, either as hydroxides or salts, could be used: tetrabutylammonium iodide, hexyltrimethylammonium bromide, octyltrimethylammonium chloride, dodecyltrimethylammonium chloride, tetradecyltrimethylammonium chloride, hexadecyltrimethylammonium chloride, hexadecylbenzyldimethylammonium chloride and octadecylbenzyldimethylammonium chloride. Quaternary ammonium bases, such as tetramethylammonium hydroxide, tetraethylammonium hydroxide, etc., which do not have the requisite structure and hence lack the essential solubility in the polymeric esters, are inoperable in the process of this invention.

In the table below is a comparison of the activity of a number of compounds. The heterogeneous hydrolyses recorded in this table were performed on 10 parts of a medium viscosity polyvinyl acetate, in bead form using 100 parts of water, 4.6 parts of sodium hydroxide and 1 part of the catalyst. The temperature used was 90° C. to 95° C. and stirring was accomplished in each case by a uniform procedure. The surface tensions reported are in dynes per centimeter and are for 1% aqueous solutions of the catalyst at 25° C. These values correspond closely to the surface tensions of the respective reaction media. In all cases the initial pH was about 12. At the end of the effective hydrolysis experiments the pH was about 9 or 10

Table

| Catalyst | Surface Tension | Time, hrs. | Per cent Hydrolysis |
|---|---|---|---|
| Control—None | above 75 | 48 | 75 |
| $(CH_3)_4NOH$ | 74 | 6 | 0 |
| $(C_2H_5)_4NOH$ | 57 | 6 | 0 |
| $(C_3H_7)_4NOH$ | 57 | 22 | 100 |
| $(HOCH_2CH_2)_4NOH$ | | 22 | 0 |
| $C_6H_5(CH_3)_3NOH$ | 63 | 8 | 0 |
| $C_6H_5(CH_3)_3NOH$ | 53 | 24 | 40 |
| $C_6H_5CH_2(CH_3)_3NOH$ | | 8 | 0 |
| $C_6H_5CH_2(CH_3)_3NOH$ | | 24 | 40 |
| $(C_4H_9)_4NI$ | 48 | 3 | 80 |
| $(C_4H_9)_4NI$ | 48 | 16 | 100 |
| $C_{16}H_{33}C_6H_5CH_2(CH_3)_2NCl$ | 40 | 16 | 100 |
| $C_{18}H_{37}C_6H_5CH_2(CH_3)_2NCl$ | 40 | 16 | 100 |
| $C_{14}H_{29}(CH_3)_3NCl$ | 30 | 5.5 | 100 |
| $C_{16}H_{33}(CH_3)_3NCl$ | 30 | 5.5 | 100 |
| $C_{12}H_{25}(CH_3)_3NCl$ | 29 | 5.5 | 100 |

From the above table it can be seen readily that at surface tensions above 50 dynes per centimeter heterogeneous hydrolysis occurs only very slowly. At surface tensions of 50 dynes per centimeter or below, the heterogeneous hydrolysis occurs rapidly. For example, using tetraethylammonium hydroxide, the surface tension being 57 dynes per centimeter, little or no hydrolysis occurred after 6 hours heating, whereas with hexadecyltrimethylammonium chloride hydrolysis was complete in 5.5 hours, the reaction media having a surface tension of 30 dynes per centimeter. Thus, use of the catalysts of this invention results in a marked economy and makes the heterogeneous hydrolysis of polyvinyl esters a feasible commercial operation.

The quaternary ammonium compounds are generally employed as the acid salts. These are converted by the action of the strong inorganic bases present to the quaternary ammonium base and the corresponding inorganic salt. The quaternary ammonium compound, however, can be and often is, employed initially as the free base. It is essential that the base be reasonably soluble in the ester being hydrolyzed. Sulfonium bases having at least one alkyl chain of 10 or more carbon atoms and long chain alkyl guanidines have the necessary solubility and may be used instead of the quaternary ammonium compounds described above.

The inorganic base employed may be any base which is soluble in water and sufficiently strong to permit adjustment of the pH of the hydrolyzing medium to about 10 or more. Many of the organic bases are sufficiently basic to provide media having the desired basicity and it is possible to hydrolyze the polyvinyl esters in a heterogeneous manner using the organic bases alone. However, the inorganic bases are much more inexpensive and it is the practice to use them in relatively larger amounts and to use the more expensive organic bases as catalysts in relatively small amounts. Examples of inorganic bases are sodium hydroxide, potassium hydroxide and lithium hydroxide. The proper choice of the quaternary base and the proper adjustment of the pH of the hydrolysis media permits the preparation of a media having a favorable surface tension of less than 50 dynes per centimeter. If the surface tension is appreciably greater than 50 dynes per centimeter, proper penetration of the organic base into the solid polymer does not occur and hydrolysis either does not occur or at most proceeds at an exceedingly slow rate. Likewise if the initial pH is below 10, hydrolysis occurs only very slowly.

The temperature at which hydrolysis is carried out is preferably between 90° C. and 95° C. Lower temperatures, such as 0° C. to 90° C., may be employed, however, if desired, but under these conditions the reaction generally is very slow. The rate of hydrolysis may be increased by using higher temperatures, such as 95° C. to 150° C. These temperatures may be obtained by well known methods. However, relatively complicated apparatus is required and in certain instances a substantial risk of degrading the polymers is taken.

The time of hydrolysis will, of course, vary with the degree of hydrolysis desired, the temperature, the concentration of the bases and the particular bases employed. In general, the reaction will be complete in 4 to 20 hours, although longer or shorter times can be used. As usually employed the hydrolysis reaction of this invention is continued until useful products are obtained, as, for example, water-soluble polyvinyl alcohols.

Hydrolysis, however, may be terminated at any point prior to this if desired.

While the invention has been described with particular reference to the hydrolysis of polyvinyl acetate and polymethyl acrylate, other esters may be advantageously hydrolyzed by the process of this invention. For example, polyvinyl formate, polyhydroxyalkane esters and interpolymers of vinyl acetate and other polymerizable monomers, such as ethylene/vinyl acetate and vinyl chloride/vinyl acetate copolymers are also hydrolyzable by means of this invention. So also are copolymers of vinyl chloride and diethyl fumarate.

In the hydrolysis of polyvinylacetate by the process of this invention, the beads of the polymer actually grow in size in the initial stages of the reaction. As hydrolysis occurs, the number of hydroxyl groups on the polymer chain increases with attendant water-solubility. In this basic hydrolysis, the following steps are postulated:

1. After hydrolysis of the quaterary ammonium salt by the inorganic base to the corresponding quaternary ammonium base, an equilibrium is established between molecules of the base CtOH, and the cation Ct+ , and the anion OH−:

$$Ct^+ + OH^- \leftrightarrows CtOH$$

2. Molecules of water and of the quaternary ammonium base dissolve in the polyvinyl acetate with resultant swelling of the polymer beads.

3. Ionization of these molecules occurs within the polymer bead and hydrolysis proceeds:

$$CtOH \leftrightarrows Ct^+ + OH^-$$

Polyvinylacetate + OH− →
         Polyvinyl alcohol + CH₃COO−

Finally, the bead disappears when hydrolysis has produced a polymer soluble in the reaction medium.

Accordingly, the chief function of the strong, water-soluble, inorganic base is to increase the concentration of molecules of the quaternary ammonium base, CtOH, in the reaction medium and within the polymer bead. There must be a concentration of hydroxyl ions from the inorganic base sufficient to produce an effective concentration of molecular quaternary ammonium base within the polymer bead. It has been found that at a pH of about 10 or above and at surface tensions of 50 dynes per centimeter or less, concentrations of the desired effectiveness are obtained. Inorganic bases alone, that is, in the absence of the effective quaternary ammonium bases, do not efficiently hydrolyze the polymeric esters under the conditions of this invention, as shown in the table.

The quaternary ammonium compounds are ineffective in acidic media. Under such conditions the quaternary compound exists chiefly in the form of its ions Ct+ and X−, where X− represents the anion of the particular acid used. Sufficient quantities of the essential molecules CtOH are not present. The water-insoluble polymeric esters are not readily penetrated by ions. Thus, when 60 parts of polyvinyl acetate, 100 parts of water, 1 part of cetyldimethylbenzyl-ammonium chloride and 1 part of concentrated sulfuric acid were heated at 90° C. to 95° C. with stirring for 120 hours, no apparent change occurred in the polyvinyl acetate. As is shown in copending application Serial No. 742,466, acidic media require anionic catalysts, whereas basic media require cationic catalysts.

The process of this invention may be used advantageously in the hydrolysis of a large number of water-insoluble polymeric esters. Unlike prior processes, excessive amounts of acid or solvent are not consumed. No solvents are used, and recovery steps are, therefore, minimized. Further, the acid obtained from the polymeric ester is recovered readily from its simple salts. The efficiency of the catalysts permit their use in small inexpensive amounts and also the completion of hydrolysis in relatively short periods of time. The products of this invention may be used, in film and fiber form and, in general, wherever the polymers, for example, polyvinyl alcohol, find application.

Any departure from the above description which conforms to the present invention is intended to be included within the scope of the claims.

I claim:

1. A process for heterogeneously hydrolyzing a water-insoluble polyvinyl ester comprising a carboxylic acid ester of polyvinyl alcohol which comprises forming a mixture of water and a quaternary ammonium base having at least one alkyl chain at least four carbon atoms in length, said quaternary ammonium base being appreciably soluble in said ester in the presence of water; adding to the resultant hydrolyzing medium said water-insoluble polyvinyl ester, thereby forming a heterogeneous mixture which has an initial pH of at least 10 and a surface tension of less than 50 dynes per centimeter and thereby dissolving at least a portion of said quaternary ammonium base in said polyvinyl ester and then hydrolyzing said ester by heating said heterogeneous mixture.

2. A process in accordance with claim 1 wherein said ester is polyvinyl acetate.

3. A process in accordance with claim 1 wherein said quaternary ammonium base is dodecyltrimethyl ammonium hydroxide.

4. A process in accordance with claim 1 wherein said quaternary ammonium base is cetyldimethylbenzyl ammonium hydroxide.

5. A process in accordance with claim 1 wherein said base is tetrabutyl ammonium hydroxide.

6. A process in accordance with claim 1 wherein a strong water-soluble base is contained in said heterogeneous mixture.

7. A process for heterogeneously hydrolyzing polyvinyl acetate which comprises adding to water sodium hydroxide and cetyldimethylbenzyl ammonium hydroxide; adding to the resultant hydrolyzing medium polyvinyl acetate, thereby forming a heterogeneous mixture which has an initial pH of at least 10 and a surface tension of less than 50 dynes per centimeter and thereby dissolving at least a portion of said cetyldimethylbenzyl ammonium hydroxide in said polyvinyl acetate; and then hydrolyzing said polyvinyl acetate by heating said heterogeneous mixture at a temperature of 90° C. to 95° C.

ROE C. BLUME.

REFERENCES CITED

The following references are of record in the file of this patent:

UNITED STATES PATENTS

| Number | Name | Date |
|---|---|---|
| 2,144,202 | Schlack | Jan. 17, 1934 |
| 2,208,857 | Schlack | July 23, 1940 |
| 2,467,774 | Plambeck | Aug. 19, 1949 |